Sept. 12, 1950 W. COOKSON 2,522,097
JOINT BETWEEN RESILIENT SHEET MATERIAL PARTS
Filed Dec. 27, 1946 2 Sheets-Sheet 1
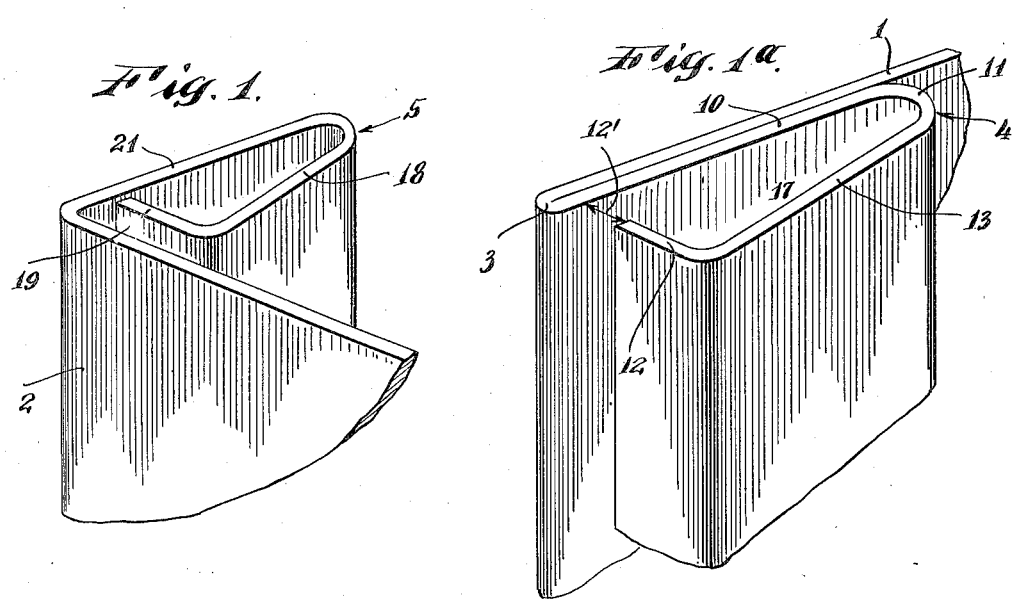
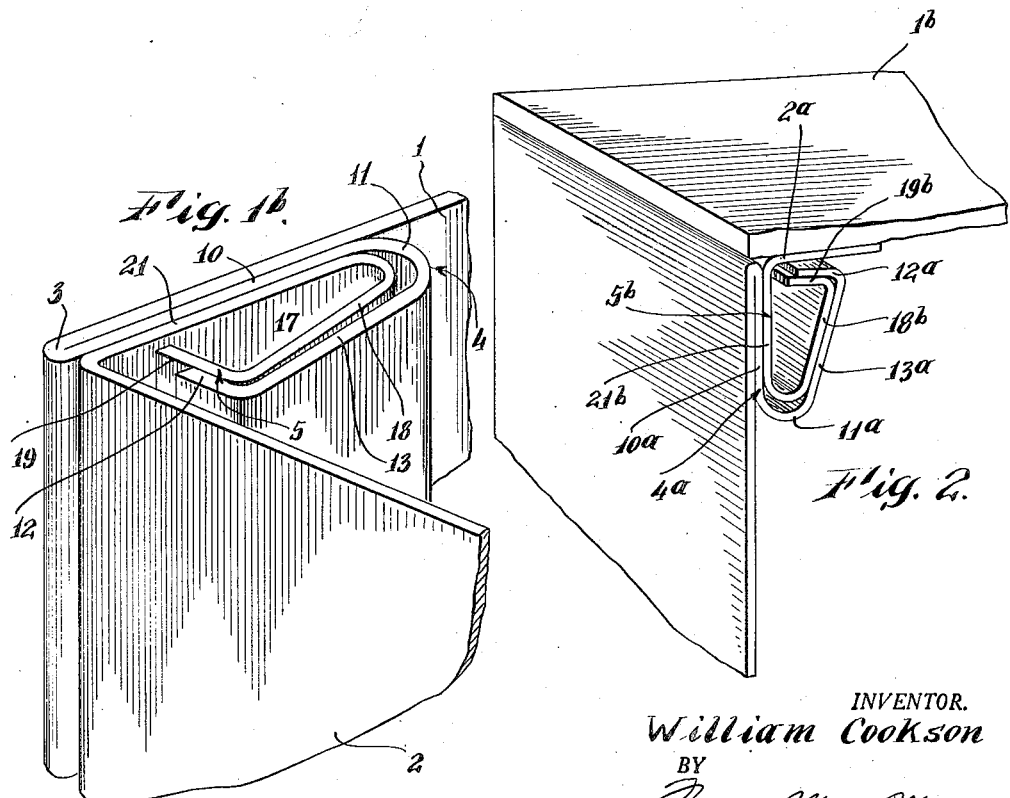
INVENTOR.
William Cookson
BY
Fraser, Myers & Manley
ATTORNEYS.

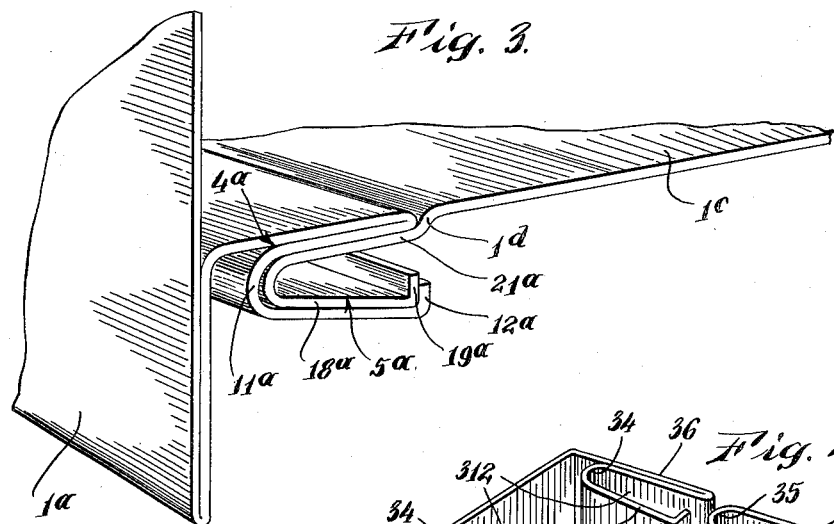
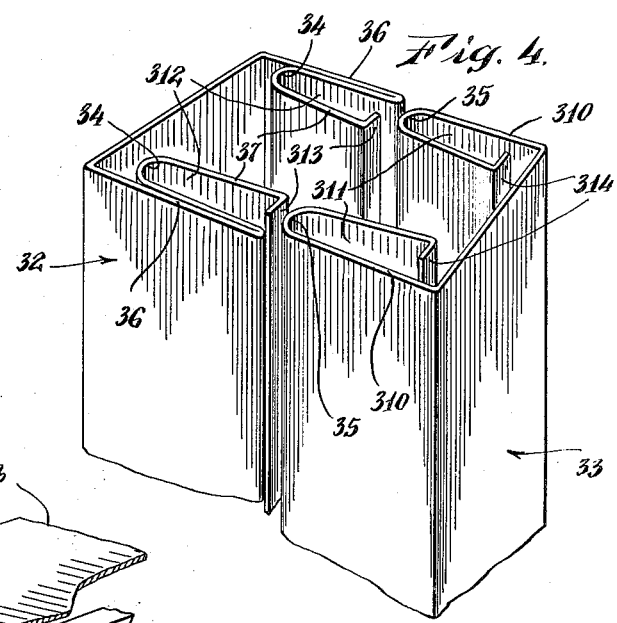
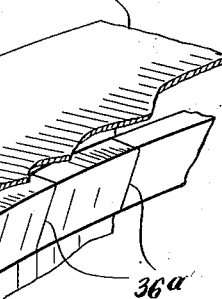

Patented Sept. 12, 1950

2,522,097

UNITED STATES PATENT OFFICE 2,522,097

JOINT BETWEEN RESILIENT SHEET MATERIAL PARTS

William Cookson, Fareham, England

Application December 27, 1946, Serial No. 718,823
In Great Britain January 10, 1946

5 Claims. (Cl. 189—36)

This invention relates to joints for sheet material parts and aims to provide certain improvements therein.

The primary object of the invention is to provide a simple and effective snap action lock joint which is applicable in assembling sheet material structures. A further object is to provide such joints which will be strong, free from looseness and incapable of accidental separation.

In accomplishing the foregoing and other objects of my invention not specifically enumerated, I provide a joint between resilient sheet material parts comprising a male member and a female member, each of said members having two divergent walls joined by a broad curved apex, the first of said walls being integral with a panel, a second wall being free and having a free end in the form of a lip extending toward but spaced from the first wall, the walls and lips on the respective members being disposed in nested relation with the lip and at least one wall of the respective members in contact, and said members being so dimensioned to enable them to be forced into assembled relation by a relative movement between the apex of the male member with respect to the space between the lip and first wall of the female member.

The invention will be better understood from the detailed description which follows, when considered in connection with the accompanying drawings, wherein:

Figs. 1, 1a and 1b are perspective views respectively of the male member, the female member and the assembly of such members.

Fig. 2 is an isometric view of the invention applied to the junction of cabinet walls.

Fig. 3 is an isometric view of a portion of a cabinet shelf embodying a sheet material joint coming within the scope of my invention.

Fig. 4 is an isometric view of a modified form of the invention suitable for application to the junction of partition walls or columns.

Fig. 5 is an isometric view of a further modification of my invention illustrating the applicability of the invention to curved joints.

In Figs. 1, 1a and 1b I have shown an application of my invention to a panel or unit construction for cupboard and partitions for building purposes wherein the panels will be self-aligning when assembled, the joints between said panels consisting of interlocking male and female members. Thus the wall panels 2 and 1 are formed respectively with fastening means consisting of male and female locking members which, when in engagement, form a column of considerable strength. The panel 1 is folded back on itself at 3 and bent to form a female locking member 4, and the other panel 2 is bent to form a cooperative male locking member 5. The panels 1 and 2 may be formed of any suitable metal such as steel or aluminum alloy or of plastics or other suitable springy material.

The female locking member 4 has two divergent walls 10 and 13 joined by a broad curved apex 11 the chord length of which is not less than approximately one-third of the length of the wall 13. The wall 13, which is termed a free wall, has an inturned lip or base 12 the free edge of which is spaced away from the adjacent wall 10. The free wall 13 between the apex 11 and the lip 12 is flat and forms with the lip 12 an angle which is preferably less than a right angle. A substantially cuneiform partially open base space 17 is thus formed between the walls 10 and 13, and the side formed by the lip 12 and the space 12' between said lip and the wall 10 (Fig. 1a) is so dimensioned that the width of said space is substantially one-half the width of the lip.

The male locking member 5 is of cuneiform shape similarly dimensioned to the female member 4. The free wall 18 of the male member 5 is so bent that the lip 19 thereof has its free edge spaced from the side 21. The male and female members are so proportioned that when assembled, the length from the apex of the member 5 to its base 19 is so much shorter than the length from the apex of the member 4 to its base 12 that the member 5 can be forced within the member 4 so that the base 12 will spring over and lock behind the base 19.

In use, the panels 2 and 1 which it is desired to connect by the male and female fastening members, are caused to relatively approach each other so that the male member 5 is forced within and seats in nested engagement with the female member 4 with a lip and at least one wall of the respective members in contact. It is preferable, however, that when assembled, the respective walls and lips be in substantially contacting relation whereby to prevent relative movement between the members except in a direction longitudinally of the joint.

Alternatively, the male member may be comparatively rigid and the female member may be springy. Thus if the female member 4 is made of sufficiently springy material, then the male member 5 could be substantially rigid or of solid section.

In the form of the invention illustrated in Fig.

2 the female locking member 4a is formed by bending the material of the wall 1a of a cabinet and the sides 10a, 11a, 12a and 13a are of similar shape and function to the corresponding sides 10, 11, 12 and 13 of the female locking member 4 of Fig. 1a. The male locking member 5b resembles the male locking member 5 of Fig. 1 and its sides 18b, 19b and 21b function similarly to the corresponding sides 18, 19 and 21. In this case the side 2a is attached directly to the top 1b of the cabinet.

In the embodiment of the invention illustrated in Fig. 3 not only is the female locking member 4a formed by bending the material forming wall 1a but the male locking member 5a is also made integral with the adjacent cupboard shelf 1c. The sides 19a, 18a, and 21a are similar to and have the same function as the sides 19, 18 and 21, respectively, of Fig. 1. However, in order that the top surface of the shelf 1c shall lie flush with the top surface of the arm formed with the female member 4a, the shelf 1c is formed with an offset portion 1d whereat the male member 21a is formed.

In Fig. 4 I have shown two pairs of interlocking joints formed upon troughed or channeled members 32 and 33. One pair of female locking members 34 are formed on the member 32 and another pair of cooperative male locking members 35 are formed on the member 33. To form the female locking members 34 the troughed member 32, which is of U-shape cross-section, has each side 36 so bent that it lies against the inner face of one of the parallel limbs of the trough and then back again at 37 to provide a substantially cuneiform space 312. The trough member 33 has its sides 310 bent to form male members having cuneiform spaces 311 similar to the cuneiform spaces 312 formed by the female locking members 34 but of sufficiently smaller dimension than the latter to enable the male locking members to be engaged, nested, and locked within the said female members 34. The free ends 313 of the members 34 are turned towards the sides 36. Each male member 35 is so bent that the base 314 thereof extends parallel to the base of the trough 33. To assemble the troughs 32 and 33 into a unit, they are moved together so that the flanges 313 on the female members 34 engage behind the flanges 314 on the male members 35 in the manner previously explained with respect to Fig. 1b.

In the modification of the invention shown in Fig. 5 circumferentially curved sheets of material 32a and 32b are shaped to form female members 34a and male members 35b, respectively, similar to those hereinbefore described in both construction and function. The members 34a are interrupted by being split at intervals, as shown at 36a, to facilitate engagement. In this case the axis of the joints is curved, and disengagement can only be effected by sliding one member relatively to the other in a curved path.

By providing panels, troughs and the like with male and female joint members as described, the articles to be assembled may be dispatched unassembled for transit and subsequently assembled for use merely by forcing the desired members together.

What I claim is:

1. A joint between resilient sheet material parts comprising a male member and female member, each of said members having two divergent walls joined by a broad curved apex, the first of said walls being integral with a panel, the second wall being free and having a free end in the form of a lip extending toward but spaced from the first wall, the walls and lips on the respective members being disposed in nested relation with the lip and at least one wall of the respective members in contact, and said members being so dimensioned to enable them to be forced into assembled relation by a relative movement between the apex of the male member with respect to the space between the lip and first wall of the female member.

2. A joint according to claim 1, wherein the walls and lips on the respective members are in substantially contacting relation.

3. A joint according to claim 1, wherein one of the walls of the male member is offset and extends parallel to the panel with which it is integral.

4. A joint according to claim 1, wherein each of said members is curved in the direction of the axis of the joint and the free wall of at least one of the members is formed with slits spaced apart in the curved direction of the joint.

5. A joint according to claim 1, wherein each of said members is curved in the direction of the axis of the joint and the free wall of the female member is formed with slits spaced apart in the curved direction of the joint.

WILLIAM COOKSON.

REFERENCES CITED

The following references are of record in the file of this patent:

UNITED STATES PATENTS

| Number | Name | Date |
| --- | --- | --- |
| 1,186,841 | Russell | June 13, 1916 |
| 1,934,330 | Ruppelt | Nov. 7, 1933 |
| 2,175,605 | Holub | Oct. 10, 1939 |
| 2,259,382 | Ingels | Oct. 14, 1941 |
| 2,381,030 | Blackburn | Aug. 7, 1945 |
| 2,384,402 | Schubert et al. | Sept. 4, 1945 |